UNITED STATES PATENT OFFICE.

HEINRICH COLLOSEUS, OF BERLIN, GERMANY.

PROCESS FOR MANUFACTURING CEMENT FROM BLAST-FURNACE SLAG.

No. 837,918.  Specification of Letters Patent.  Patented Dec. 11, 1906.

Application filed March 22, 1905. Serial No. 251,446.

*To all whom it may concern:*

Be it known that I, HEINRICH COLLOSEUS, chemist and doctor of philosophy, a subject of the German Emperor, residing at 29 Pragerstrasse, in the city of Berlin, Kingdom of Prussia, and German Empire, have invented a certain new and useful Process for Manufacturing Cement from Blast-Furnace Slag, of which the following is a specification.

This invention has reference to the manufacture of cement from blast-furnace slag; and it consists in a process wherein an addition of solutions of calcium salts, aluminium salts, and magnesium salts is made to the slag, according to its composition, on the discharge of the slag from the blast-furnace—that is to say, while it is yet in a liquid condition.

It is a well-known fact that blast-furnace slag, both the flour-like powder as well as the powdered granulated slag, possesses hydraulic qualities; but these powders will set only after several days and either do not attain at all the strength required of cement or, in the case of particularly favorable compositions of slags, only after some months, so that they cannot be regarded as cements proper, practically speaking.

My present invention consists in introducing into the liquid blast-furnace slag salts of lime, of alumina, or of magnesia, in solution, one or more of these, according to the proportion of lime, alumina, magnesia, and silicic acid contained in the slag and according to the hydraulic qualities dependent thereon.

The process is carried out as follows: The stream of liquid slag when it runs out from the blast-furnace is finely distributed, and at the same time an aqueous solution of calcium salts, of alum, of sulfate of magnesia, or of any other salt or salts of one or more of these three metals is allowed to act upon this finely-distributed slag. Water-vapor will then be evolved and also small quantities of vapors of sulfur dioxid formed by oxidation. The salts dissolved in the solution, whether they are calcium, alum, or magnesium salts or all three together, combine apparently with the silicic acid, with the lime, and the alumina of the blast-furnace slag to form di and tri calcium, aluminium, or magnesium silicates. The sulfuric acid present in the salts or produced by oxidation acts upon the calcium sulfid contained in the blast-furnace slag, so as to form the valuable calcium sulfate. The liberated water serves at the same time for the rapid cooling of the slag, and more particularly with iron-foundry slags, which are very rich in lime and which without this rapid cooling would become disintegrated and form a flour, the so-called "smelters' flour." It also produces the effect of causing such slag to resist the action of air and represents a kind of clinker. The vapor produced from the aqueous solution by the contact with the hot slag is a very efficient agent in effecting a disintegration of the slag and incorporating the salts with the hot slag. The dissociation which is thereby set up and the consequent liberation of the acid constituent of the salts is probably a great adjuvant in obtaining the peculiar degree of disintegration and the physical properties on which the value of cement, and of Portland cement in particular, depends. It is obvious that by a mere melting together of the alkaline-earth constituents of the salts with the slag this object of the change of physical properties cannot be obtained, as it is not possible to have the salts so finely distributed or to produce the disintegration desired. The thus treated slag is distinguished from the untreated slag, apart from its chemical composition, in the following points as regards physical properties: first, as compared with the above-mentioned smelters' flour, disintegrated flour-like slag, and water-granulated and air-treated slag, slags treated according to the process herein described react considerably more readily; second, while the disintegrated flour, the dried water-granulated slag, and the air-treated slag either do not harden at all in most cases or only after some weeks, so as to form a kind of cement, the slag treated according to the process herein described exhibits the physical behavior of a good Portland cement—that is to say, it sets within ten minutes to six hours.

Chemically speaking, the slag treated according to the process stated is distinguished from smelters' flour, disintegrated-slag flour, water-granulated slag, and slag that has undergone an air treatment by the fact that the sulfid of lime, which is generally contained in very large quantities in the smelters' flour, in the water-granulated slag and in the air-treated slag is completely oxidized, or at least the largest proportion of it, so as to form sulfate of lime.

The amount of salts to be used varies with the composition of the particular slag. If, for example, blast-furnace slag is to be treated containing approximately from twentysix to thirty-two per cent. of silica, from twelve to eighteen per cent. of alumina and iron, and from forty-five to fifty per cent. of lime, it is sufficient to inject into the freshly-prepared molten slag from six to ten per cent. of the solutions of salts containing, as an instance, about five per cent. of nitrate or sulfate or other suitable salt of the above-mentioned metals. It has, however, been found that slag containing a higher proportion of silica and less lime can also be made to harden in the same manner as cement—that is to say, it can also be used for the manufacture of cement, answering the standard requirements if solutions containing a higher percentage of salt—for instance, up to ten per cent.—are injected, thus increasing the proportion of salts in relation to the slag. With slags of approximately the composition hereinbefore mentioned I prefer to use sulfate of magnesia alone in the majority of cases; but with slags of different composition the best salt or combination of salts for producing the desired result can only be ascertained by experiment. If the slag is thick in flowing or is not perfectly liquid, it is desirable to reduce the percentage of solution used, at the same time increasing its strength in proportion. The object of this is not to cool the slag too much in the operation.

I am aware that salts, and in particular sodium salts or gypsum, have been added to hot liquid slag in a dry state in order to remove some impurities of the slag by mutual decomposition and subsequent skimming off the products of decomposition. This is, however, entirely different from my invention, inasmuch as in my invention the action depends mainly on a change of physical properties, as above outlined, and upon the very fine state of distribution of the salts and of disintegration of the slag, due to the fact of adding the salts in aqueous solution, while the chemical reactions which are set up are also entirely different from those set up by the melting together of the reagents with the slag.

I am also aware that attempts have been made to improve the quality of slag cement by treating molten but not necessarily freshly-prepared and very highly heated slag with a mixture of lime and chlorid of lime, in which the lime was greatly in excess of the chlorid of lime, so as to form a paste of lime containing a small percentage of chlorid of lime, in order to increase the amount of lime to be incorporated with the slag; but this also is not the object of my invention, which aims to produce a finished perfect cement without any subsequent addition of lime to the molten slag and merely by the physical changes set up by the dissociation produced upon the addition of the small quantities of solutions of salts of the alkaline earths and of the earth metals to the slag, as above outlined, and without any further addition of alkaline or alkaline-earth oxid or of any other ingredient not already present in the slag, with the exception of said salts.

What I claim, and desire to secure by Letters Patent of the United States, is—

1. The process herein described of manufacturing cement from blast-furnace slag, which consists in treating freshly-prepared hot liquid blast-furnace slag with a solution of any water-soluble salt of the earthy oxid-forming metals and without any further addition.

2. The process of manufacturing cement from blast-furnace slag which consists in acting upon freshly-prepared hot liquid blast-furnace slag with relatively small quantities of the solution of any water-soluble salt of the earthy oxid-forming metals and without any further addition.

3. The process of manufacturing cement from blast-furnace slag which consists in acting upon freshly-prepared hot liquid blast-furnace slag with a solution of any water-soluble salt of the earthy oxid-forming metals, the slag being largely in excess of said solution, and without any further addition, and then allowing the product to cool.

4. The process of manufacturing cement from blast-furnace slag which consists in acting upon freshly-prepared hot liquid blast-furnace slag with a solution of any water-soluble salt of the earthy oxid-forming metals, most deficient in the composition of the slag, the slag being largely in excess, and without any further addition and allowing the product to cool.

5. The process of manufacturing cement from blast-furnace slag which consists in acting upon freshly-prepared hot liquid blast-furnace slag with so much of a solution of any water-soluble salt of the earthy oxid-forming metals, the slag being largely in excess, as to avoid chilling of the slag during the operation, and without any further addition, and then allowing the product to cool.

In witness whereof I have hereunto signed my name, this 25th day of February, 1905, in the presence of two subscribing witnesses.

HEINRICH COLLOSEUS.

Witnesses:
HENRY HASPER,
WOLDEMAR HAUPT.